United States Patent
Eichholz et al.

(10) Patent No.: US 8,132,737 B2
(45) Date of Patent: Mar. 13, 2012

(54) AIRCRAFT AIR-CONDITIONING SYSTEM FOR AN AIRCRAFT CABIN HAVING A PLURALITY OF ZONES

(75) Inventors: Johannes Eichholz, Hamburg (DE); Torsten Schwan, Pinneberg (DE)

(73) Assignee: Airbus Deutschland GmbH, Hamburg (DE)

( * ) Notice: Subject to any disclaimer, the term of this patent is extended or adjusted under 35 U.S.C. 154(b) by 628 days.

(21) Appl. No.: 12/014,330

(22) Filed: Jan. 15, 2008

(65) Prior Publication Data
US 2008/0168786 A1    Jul. 17, 2008

Related U.S. Application Data

(60) Provisional application No. 60/885,246, filed on Jan. 17, 2007.

(30) Foreign Application Priority Data

Jan. 17, 2007   (DE) .................. 10 2007 002 538

(51) Int. Cl.
   *F24D 19/10*   (2006.01)
   *F24F 11/00*   (2006.01)
   *G05D 23/275*  (2006.01)

(52) U.S. Cl. ........... 236/1 B; 62/208; 700/277; 700/278; 700/299

(58) Field of Classification Search .................. 62/205, 62/208; 236/1 B; 700/277, 278, 299, 300
See application file for complete search history.

(56) References Cited

U.S. PATENT DOCUMENTS

| | | | | |
|---|---|---|---|---|
| 5,145,124 A * | 9/1992 | Brunskill et al. | .......... | 244/118.5 |
| 5,479,983 A | 1/1996 | Fischer et al. | | |
| 5,545,084 A * | 8/1996 | Fischer et al. | .......... | 454/76 |
| 7,337,623 B2 * | 3/2008 | Fauret | ............ | 62/180 |
| 2006/0065753 A1 * | 3/2006 | Fauret | ............ | 236/49.3 |

FOREIGN PATENT DOCUMENTS

| | | |
|---|---|---|
| DE | 103 61 721 | 8/2005 |
| EP | 0615905 | 9/1994 |
| WO | WO 2005063575 A1 * | 7/2005 |
| WO | WO 2005063578 A1 * | 7/2005 |

* cited by examiner

*Primary Examiner* — Marc Norman
*Assistant Examiner* — Paolo Gonzalez
(74) *Attorney, Agent, or Firm* — Wood Herron & Evans LLP

(57) ABSTRACT

An air-conditioning system and associated method for air-conditioning an aircraft cabin including a first zone and a second zone of variable length and at least one intermediate zone is provided. The intermediate zone is selectively associated with the first zone or the second zone. Air at a first set temperature is supplied to the first zone, and air at a second set temperature is supplied to the second zone. Likewise, air at a third set temperature is supplied to the intermediate zone. A regulating device regulates the third set temperature such that if the intermediate zone is associated with the first zone, the third set temperature corresponds substantially to the first set temperature; but if the intermediate zone is associated with the second zone, the third set temperature.

14 Claims, 5 Drawing Sheets

AIRCRAFT AIR-CONDITIONING SYSTEM FOR AN AIRCRAFT CABIN HAVING A PLURALITY OF ZONES

CROSS-REFERENCE TO RELATED APPLICATIONS

This application claims priority to the filing dates of U.S. Provisional Patent Application No. 60/885,246, filed on Jan. 17, 2007, and German Patent Application No. 102007002538.8, filed on Jan. 17, 2007.

TECHNICAL FIELD

The invention relates to a flexible aircraft air-conditioning system for a flexible aircraft cabin, which comprises a plurality of zones of variable lengths. The aircraft air-conditioning system may be flexibly adapted to the actual length of a zone.

BACKGROUND OF THE INVENTION

In aircraft of the prior art, an alteration to the layout of an aircraft cabin generally requires changing the air distribution and the temperature regulation of the aircraft air-conditioning system. Such a change is costly and time-consuming. In an aircraft air-conditioning system of the prior art, a stream of cold, pre-conditioned air is tapped off in order to supply different zones of an aircraft cabin. The individual blow-in temperature of separate zones is determined by heating devices. Such heating is devices may, for example, be trim valves which are also denoted as trim air valves (TAV). To reach a pleasant temperature in the respective zones, it may be necessary that air at different temperatures is supplied to the zones. The thermal loads in one zone are, for example, determined by the passenger density thereof and the electronic entertainment devices present therein For example, in a zone with few passengers a higher blow-in temperature is required than in a zone with many passengers.

The division and the size of the zones, for example for first class, business class and economy class, are partially altered at short notice by the users of the aircraft, i.e. according to the respective need. If the boundary of a zone is displaced, in order for example to increase the size of business class, in the prior art it is also necessary to modify the air distribution system. The transition of the different blow-in temperatures should take place as accurately as possible at the boundary of the two zones, so that the air stream adapted to the passenger density may also be made available to the passengers in the transition region.

The alteration to the length of a zone involves a considerable cost. The air outlets of both zones have to be modified. Moreover a further calibration of the entire air distribution system, for example by means of deflection plates, is required as the pressure ratios and volumetric flows are altered. Already at the aircraft design stage, supply lines to the two zones have to be designed respectively according to the largest configuration, i.e. the largest required supply line diameter has to be used.

The heating devices, for example the trim valves, have to be designed respectively for the largest configuration of the zone.

FIG. 1a and FIG. 1b show an aircraft cabin with a first zone 106a and a second zone 106b of variable length. The first zone 106a comprises a zone temperature sensor 116a, and the second zone 106b comprises a second zone temperature sensor 116b. In the first configuration 102 according to FIG. 1a, the first zone 106a is shorter than the second zone 106b. A first air supply line 110a, a first trim valve 108a and a first temperature sensor 112a are associated with the first zone 106a. A first distribution line 114a comprising a plurality of air outlets distributes the air supplied to the first zone 106a. A second air supply line 110b, a second trim valve 106b and a second temperature sensor 112b are associated with the second zone 106b. A second air distribution line 114b comprising a plurality of openings distributes the supplied air in the second zone 106b.

FIG. 1b shows a second configuration 104 in which the first zone 106a has been enlarged and the second zone 106b has been accordingly shortened. To this end, the length of the first air supply line 114a has been lengthened and the length of the second air supply line 114b has been shortened. As a result, in the second configuration 104 a greater air volume flows through the first air supply line 110a compared with the first configuration 102, whilst in the second configuration 104 a smaller air volume flows through the second air supply line 110b compared with the first configuration 102. This requires, for example, a re-calibration of the aircraft air-conditioning system and/or of the air distribution system, which is time-consuming and susceptible to error.

SUMMARY OF THE INVENTION

An object of the invention is to provide an improved aircraft air-conditioning system for an aircraft cabin with a plurality of zones of variable length.

The object is achieved by an aircraft air-conditioning system which comprises a first supply line, a first air-conditioning device and a first supply line temperature sensor, which are associated with a first zone of an aircraft cabin. The first supply line supplies air to the first zone. The first air-conditioning device is configured for altering the temperature of the air flowing into the first zone. The first supply line temperature sensor detects the actual temperature of the air flowing into the first zone. The aircraft air-conditioning system according to the invention further comprises a second supply line, a second air-conditioning device and a second supply temperature sensor, which are associated with a second zone of the aircraft cabin.

The second supply line supplies air to the second zone. The second air-conditioning device is configured for altering the temperature of the air flowing into the second zone. The second supply line temperature sensor detects the actual temperature of the air flowing into the second zone.

The aircraft air-conditioning system is configured for air-conditioning at least one first intermediate zone, which is located between the first zone and the second zone and may selectively be associated with the first zone and the second zone. If the intermediate zone is associated with the first zone, the intermediate zone during operation is intended to be in substantially the same air-conditioned state as the first zone. If the intermediate zone is associated with the second zone, the intermediate zone is intended to be in substantially the same air-conditioned state as the second zone. The first zone may, for example, be the business class and the second zone may, for example, be the economy class. The intermediate zone may be located between the first zone and the second zone and may, depending on the capacity utilization, be used as an extended business class or as an extended economy class.

According to the invention, a first intermediate zone supply line, which supplies air to the first intermediate zone, a first intermediate zone air-conditioning device and a first intermediate zone supply line temperature sensor are associated with the first intermediate zone. The first intermediate zone air-conditioning device is configured for altering the temperature of the air flowing into the first intermediate zone. The first intermediate zone supply line temperature sensor detects the actual temperature of the air flowing into the first intermediate zone.

The aircraft air-conditioning system according to the invention is configured such that the set temperature of the air flowing into the first intermediate zone substantially corresponds to the set temperature of the air flowing into the first zone, if the first intermediate zone is associated with the first zone. Moreover, the aircraft air-conditioning system according to the invention is configured such that the set temperature of the air flowing into the first intermediate zone substantially corresponds to the set temperature of the air flowing into the second zone, if the first intermediate zone is associated with the second zone.

In the aircraft air-conditioning system according to the invention, a flexible alteration to the zone distribution of the aircraft cabin is possible without the aircraft air-conditioning system having to be modified. Moreover, no further calibration of the aircraft air-conditioning system is required. The aircraft air-conditioning system may be altered merely by software or by so-called pin programming, in which bridge contacts are altered on a control device for the aircraft air-conditioning system, and adapted to the new zone sub-division. The diameter of the supply lines and the performance of the air-conditioning devices may be precisely adapted to the size of the zones, as no modifications which may lead to an enlargement of a zone are to be expected.

The same volumetric flow and the same air humidity may be supplied to the intermediate zone, as to the zone with which the intermediate zone is associated.

Air is heated via the first air-conditioning device, in accordance with a regulating device. The first supply line temperature sensor detects the actual temperature of the air supplied to the first zone. The detected actual temperature is transmitted to the regulating device. The air supplied by the first supply line is distributed via a first distribution line with a plurality of openings in the first zone. A first zone temperature sensor detects the actual temperature of the air in the first zone. The detected actual temperature of the zone is transmitted to the regulating device, which determines therefrom the set temperature for air flowing into the first zone. To regulate the temperature of the first zone, therefore, two cascaded regulating circuits are present. An inner regulating circuit regulates the temperature of the air in the first supply line by means of the first supply line temperature sensor and the first air-conditioning device. An outer regulating circuit regulates the actual temperature of the air in the first zone by means of the zone temperature sensor. The outer regulating circuit predetermines the set temperature of the air in the supply line. The temperature of the air in the second zone is regulated by the same method.

The aircraft air-conditioning system may be configured to air-condition a plurality of intermediate zones which are located between the first zone and the second zone and may be selectively associated respectively with the first zone or the second zone. An intermediate zone supply line, which supplies air to the intermediate zone, an intermediate zone air-conditioning device and an intermediate zone supply line temperature sensor are associated with each intermediate zone. The intermediate zone air-conditioning device is configured for altering the temperature of the air flowing into the corresponding intermediate zone. The respective intermediate zone supply line temperature sensor detects the actual temperature of the air flowing into the corresponding intermediate zone. The aircraft air-conditioning system may be configured such that, if the respective intermediate zone is associated with the first zone, the set temperature of the air flowing into the respective intermediate zone substantially corresponds to the set temperature of the air flowing into the first zone. The aircraft air-conditioning system may further be configured such that, if the respective intermediate zone is associated with the second zone, the set temperature of the air flowing into the respective intermediate zone substantially corresponds to the set temperature of the air flowing into the second zone.

If an aircraft cabin comprises a plurality of intermediate zones between the first zone and the second zone, all intermediate zones may be associated with the first zone and/or the second zone. It is understood that a part of the intermediate zones may also be associated with the first zone and a further part of the intermediate zones may be associated with the second zone.

An aircraft air-conditioning system configured in such a manner is particularly flexible, as it is able to air-condition a plurality of intermediate zones and when is altering the zone distribution no mechanical alterations to the aircraft air-conditioning system and no further calibration have to be undertaken. With this aircraft air-conditioning system the adaptation to the altered zone distribution may also take place using software or so-called pin programming.

At least one intermediate zone may be shorter than the length required to ensure a stable temperature regulation. If an intermediate zone is too short for an autonomous regulation, an unstable regulating circuit results. In the current state of the art, an intermediate zone has to have a length of at least 6 m, so that a stable autonomous regulation of the intermediate zones is possible. In this connection, the temperature sensor for detecting the actual temperature of the zone is in the centre of the intermediate zone. The aircraft air-conditioning system according to the invention may also air-condition intermediate zones with a length of less than 6 m with a stable regulation. The aircraft air-conditioning system according to the invention may air-condition intermediate zones which have a length of approximately 1 m to approximately 4 m. This is achieved by the intermediate zone being coupled to the first zone or to the second zone. The actual temperature of the air in the intermediate zone is merely controlled.

The aircraft air-conditioning system may also comprise a regulating device which is configured such that, if an intermediate zone is associated with the first zone, it regulates the set temperature of the air flowing into said intermediate zone, based on the actual temperature of the air in the first zone. The regulating device may further be configured such that, if an intermediate zone is associated with the second zone, it regulates the set temperature of the air flowing into said intermediate zone, based on the actual temperature of the air in the second zone.

The actual temperature of the air flowing through the intermediate zone supply line is regulated by means of the intermediate zone supply line temperature sensor and the intermediate zone air-conditioning device. The set temperature of the air flowing out of the intermediate zone supply line into the intermediate zone, is predetermined by the set temperature of the zone to which the intermediate zone is associated. The set temperature of the air flowing into the intermediate zone is predetermined by the regulation of the actual temperature of the air in the zone to which the intermediate zone is associated.

The first air-conditioning device, the second air-conditioning device and/or at least one of the intermediate zone air-conditioning devices may comprise a trim valve, a heating device, for example an electric heating device, and/or a cooling device.

The aircraft air-conditioning system may be configured such that, if an intermediate zone is associated with the first zone, the set temperature of the air flowing into said intermediate zone substantially corresponds to the set temperature of the air flowing into the first zone, plus an offset. The aircraft air-conditioning system may also be configured such that if an intermediate zone is associated with the second zone, the set temperature of the air flowing into said intermediate zone substantially corresponds to the set temperature of the air flowing into the second zone, plus an offset. It is understood that the offset may be positive or negative. The provision of an offset may be useful when there is particular knowledge about the thermal loads in the intermediate zone. As the intermediate zone comprises a separate regulating circuit for regulating the air flowing through the intermediate zone supply line into the intermediate zone, such an offset may be provided without difficulty. The regulating circuit for regulating the temperature of the air from the intermediate zone supply line entering the first intermediate zone detects the temperature of the air in the intermediate zone supply line by the intermediate zone supply line temperature sensor and alters the temperature of the air in the intermediate zone supply line by the intermediate zone air-conditioning device.

The aircraft air-conditioning system may be configured such that the set temperature of the air flowing into an intermediate zone substantially corresponds to the average value of the set temperature of the air flowing into the first zone and the air flowing into the second zone. The set temperature of the air flowing into an intermediate zone may substantially correspond to a weighted average value of the set temperature of the air flowing into the first zone and of the air flowing into the second zone. The weighting factors are established, for example, as a result of experiments which have been obtained with different cabin layouts.

The aircraft air-conditioning system may comprise at least one intermediate zone cabin temperature sensor which is associated with at least one intermediate zone. The regulating device may be configured such that, if said intermediate zone is associated with the first zone, it regulates the temperature of the air flowing into said intermediate zone, based on the actual temperature of the air in the first zone and the actual temperature of the air in said intermediate zone. The regulating device may also be configured such that, if said intermediate zone is associated with the second zone, it regulates the temperature of the air flowing into said intermediate zone, based on the actual temperature of the air in the second zone and the actual temperature of the air in said intermediate zone.

It must be ensured that only air of the intermediate zone circulates around the intermediate zone cabin temperature sensor. No air is allowed to flow from adjacent zones to the intermediate zone cabin temperature sensor The regulation of the set temperature of the air introduced from the intermediate zone supply line into the intermediate zone is affected by the actual temperature of the intermediate zone detected by the intermediate zone cabin temperature sensor only in combination with the actual temperature of the zone which is associated with the intermediate zone, detected by the zone temperature sensor.

The regulating device may be configured such that, if an intermediate zone is associated with and adjacent to the first zone, it regulates the temperature of the air flowing into said intermediate zone, based on the actual temperature of the air in the first zone and the actual temperature of the air in said intermediate zone. The regulating device may also be configured such that, if an intermediate zone is associated with and adjacent to the second zone, it regulates the temperature of the air flowing into said intermediate zone based on the actual temperature of the air in the second zone and the actual temperature of the air in said intermediate zone. The intermediate zone cabin temperature sensor is provided as an additional sensor for stabilizing the regulation. The intermediate zone temperature sensor, however, does not, on its own, determine the actual value which is relevant for regulating the temperature of the air entering the intermediate zone. The intermediate zone cabin temperature sensor merely detects an additional actual temperature which is combined with the actual temperature of the zone with which the intermediate zone is associated.

The intermediate zones can be arranged perpendicular to the length axis of the cabin and/or in the length axis of the cabin.

The invention also relates to a method for air-conditioning an aircraft cabin which comprises a first zone, a second zone and at least one intermediate zone. Each intermediate zone may be associated with the first zone or the second zone. The method comprises the following steps: supplying air at a first set temperature to the first zone via a first supply line, supplying air at a second set temperature to the second zone via a second supply line and supplying air in at least one intermediate zone via an intermediate zone supply line associated therewith. The set temperature of the air supplied to the intermediate zone substantially corresponds to the set temperature of the air supplied to the first zone, if the at least one intermediate zone is associated with the first zone. The set temperature of the air supplied to the intermediate zone substantially corresponds to the set temperature of the air supplied to the second zone, if the at least one intermediate zone is associated with the second zone.

The method may, moreover, comprise the following steps: detecting the actual temperature of the air in the first zone, detecting the actual temperature of the air in the second zone, regulating the set temperature of the air flowing into the first zone based on the actual temperature of the first zone, regulating the set temperature of the air flowing into the second zone based on the actual temperature of the second zone, controlling the set temperature of the air flowing into the intermediate zone based on the actual temperature of the first zone, if the intermediate zone is associated with the first zone, and controlling the set temperature of the air flowing into the intermediate zone based on the actual temperature of the second zone, if the intermediate zone is associated with the second zone.

The expressions, "first zone" and "second zone" are not to be interpreted that the aircraft cabins may comprise only two zones, between which one or more intermediate zones may be present. An aircraft cabin may, moreover, comprise a third zone, wherein one or more intermediate zones may be to be located between the second zone and the third zone. It is also possible that the aircraft cabin comprises a plurality of zones, wherein one or more intermediate zones respectively may be located between two zones. Each of these intermediate zones may be supplied with air-conditioned air by the aircraft air-conditioning system, as has been disclosed above.

BRIEF DESCRIPTION OF THE DRAWINGS

The invention is now described in more detail with reference to the accompanying schematic Figures, in which.

DETAILED DESCRIPTION

Figure 1A:
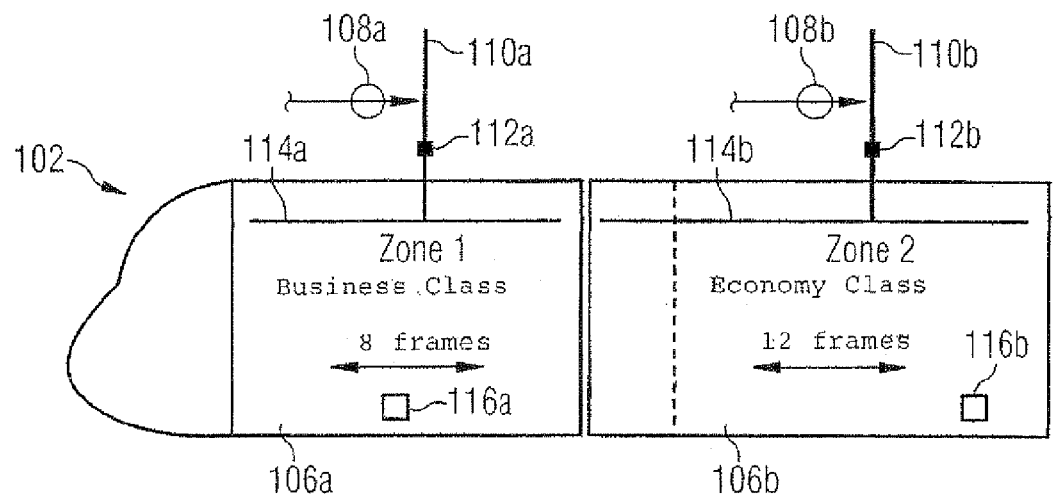
FIGS. 1a and 1b show an aircraft air-conditioning system for an aircraft cabin with a plurality of zones of variable length of the prior art.
Figure 1B:
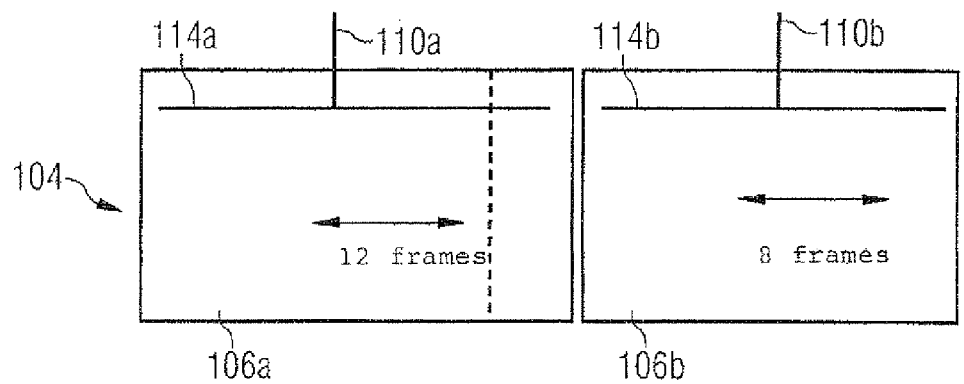
Figure 2A:
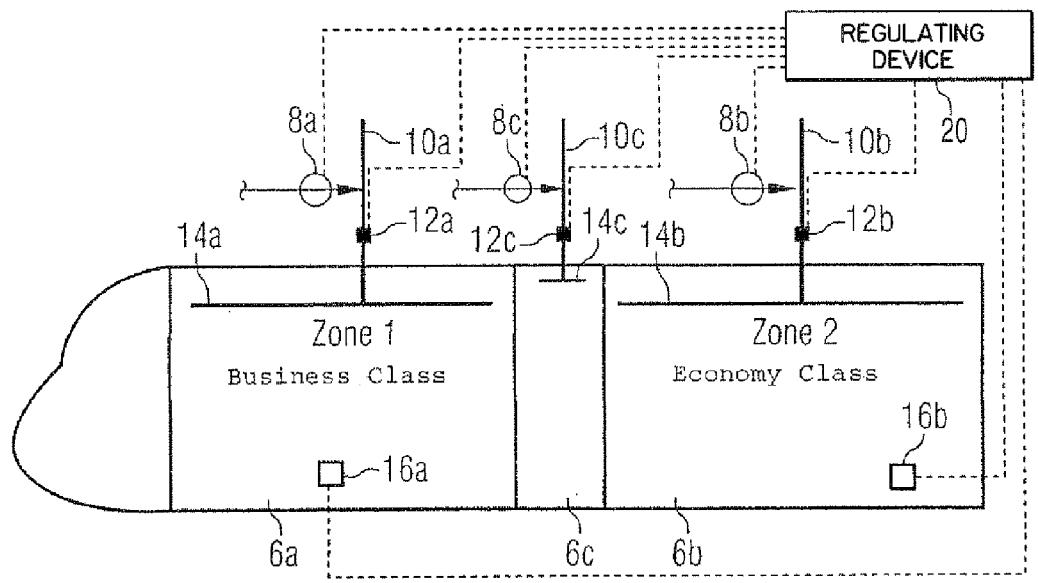
FIGS. 2a, 2b and 2c show an aircraft air-conditioning system for an aircraft cabin with an intermediate zone.

FIG. 2a shows an aircraft cabin which comprises a first zone 6a, a second zone 6b and an intermediate zone 6c, which is arranged between the first zone 6a and the second zone 6b. A supply line 10a is associated with the first zone 6a. Warm air is supplied via a trim valve 8a in accordance with a regulating device 20. A first supply line temperature sensor 12a detects the actual temperature of the air supplied to the first zone. The detected actual temperature is transmitted to the regulating device 20. The air supplied by the first supply line 10a is distributed via a distribution line 14a with a plurality of openings in the first zone 6a. A first zone temperature sensor 16a detects the actual temperature of the air in the first zone 6a. The detected actual temperature of the zone 6a is transmitted to the regulating device 20, which based thereon determines the set temperature for the air flowing into the first zone 6a. For regulating the temperature of the first zone 6a, therefore, two cascaded regulating circuits are present. An inner regulating circuit regulates the temperature of the air in the first supply line 10a, by means of the first supply line temperature sensor 12a and the first trim valve 8a. An outer regulating circuit regulates by means of the zone temperature sensor 16a the actual temperature of the air in the first zone. The outer regulating circuit determines the set temperature of the air in the first supply line 10a.

A second supply line 10b, a second trim valve 6b, a second supply line temperature sensor 12b, a second air distribution line 14b, with a plurality of openings and a second cabin temperature sensor 16b are associated with the second zone 6b. The mode of operation of said components corresponds to the components associated with the first zone 6a, so that with regard to the mode of operation thereof reference is made to the components associated with the first zone.

The aircraft cabin further comprises an intermediate zone 6c. An intermediate zone supply line 10c, an intermediate zone trim valve 8c, an intermediate zone supply line temperature sensor 12c and an intermediate zone air distribution line 14c with a plurality of openings are associated with the intermediate zone 6c. Air flows into the intermediate zone 6c via the intermediate zone supply line 10c. The air flowing into the intermediate zone 6c, is heated by the trim valve 8c. The intermediate zone temperature sensor 12c detects the actual temperature of the air flowing into the intermediate zone 6c. A regulating device 20 controls the intermediate zone trim valve 8c such that the temperature of the air, which flows into the intermediate zone 6c, corresponds to a predetermined set temperature. The temperature detected by the intermediate zone supply line temperature sensor 12c, is transmitted to the regulating device. The temperature of the air flowing into the intermediate zone 6c, is as a result only determined by an inner regulating circuit of the aforementioned cascaded regulating circuit.

Figure 2B:
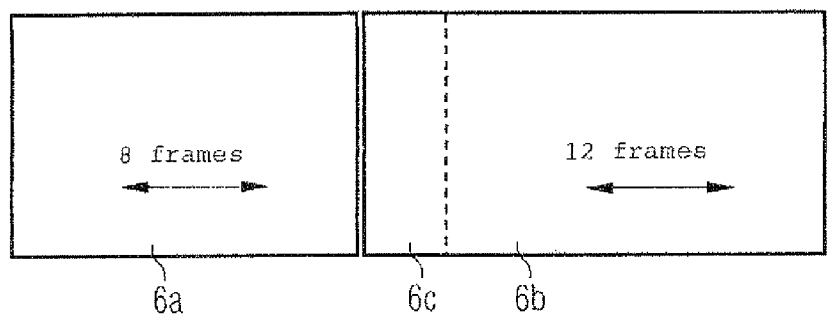

FIG. 2b shows a cabin zone configuration in which the intermediate zone 6c is associated with the second zone 6b.

The second cabin temperature sensor 16b detects the actual temperature of the air in the second zone 6b. The detected actual temperature is transmitted to the regulating device 20. As has already been mentioned, the second zone temperature sensor 16b detects the actual temperature of the outer regulating circuit of the two cascaded regulating circuits. The regulating device 20 determines from the actual temperature of the air in the second zone the set temperature of the air flowing through the second supply line lob, as has been explained above.

According to the invention, the set temperature of the air entering through the intermediate zone supply line 10c into the intermediate zone 6c, substantially corresponds to the set temperature of the air entering through the second supply line 10b into the second zone 6b. Thus the outer regulating circuit of the cascaded regulating circuit detects the set temperature of the air flowing into the second zone 6b, and the set value of the air flowing into the intermediate zone 6c. As has already been mentioned, the regulating device 20 regulates via the second trim valve 6b and the second supply line sensor 12b the temperature of the air in the second supply line 10c. The regulating device 20 also regulates via the intermediate zone trim valve 8c and the intermediate temperature sensor 12c the temperature of the air in the intermediate zone supply line 10c.

The set temperature of the air exiting from the second supply line 10b is regulated by means of the second zone temperature sensor 16b and the outer regulating circuit of the cascaded regulating circuits. However, the set temperature of the air exiting from the intermediate zone supply line 10c into the intermediate zone 6c is controlled via the second zone temperature sensor 16b and the outer regulating circuit of the cascaded regulating circuits. The air distribution line 14c which is coupled to the intermediate zone supply line 10c, is spaced to such an extent from the second zone temperature sensor 16b that a closed regulating circuit is not produced.

In the configuration according to FIG. 2b, the first zone 6a is supplied with air via the first supply line 10a, which is distributed via the first distribution line 14a in the first zone 6a. The first zone temperature sensor 16a detects the temperature of the air in the first zone 6a. Based thereon, a regulating device 20 determines the set temperature of the air flowing via the first supply line 10a into the first zone 6a. Said regulation forms the outer regulating circuit of two cascaded regulating circuits. A first supply line temperature sensor 12a detects the actual temperature of the air in the first supply line. The regulating device 20 regulates a first trim valve 8a based on the detected actual temperature of the air in the first supply line 10a. Said regulating circuit forms the inner regulating circuit of the two cascaded regulating circuits.

Figure 2C:
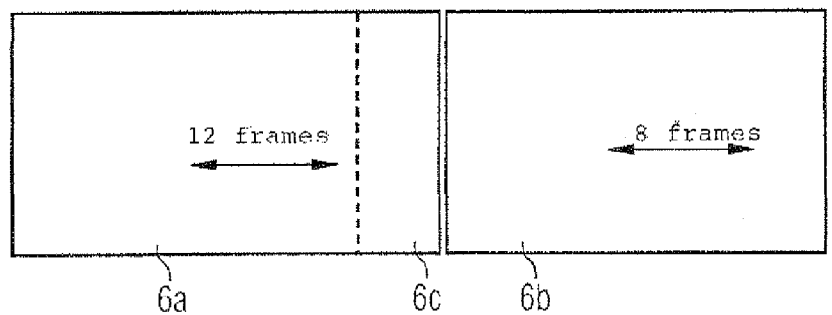

In the configuration according to FIG. 2c, the intermediate zone 6c is associated with the first zone 6a. Therefore, it is intended that the intermediate zone 6c substantially has the same temperature as the first zone 6a. The intermediate zone 6c may also have the same air humidity as the first zone 6a, It is also possible that the intermediate zone 6c is supplied with the same volumetric air flow as the first zone 6a. The first zone temperature sensor 16a detects the temperature in the first zone 6a. Based thereon, the outer regulating circuit of two cascaded regulating circuits determines the set temperature of the air in the first supply line 10a. Moreover, the set temperature of the air in the intermediate zone supply line 10c is determined from the actual temperature detected by the first zone temperature sensor 16a. The set temperature of the air in the first supply line 10a may be substantially the same as the set temperature of the air in the intermediate zone supply line 10c.

Also in this configuration, the first supply line temperature sensor 12a detects the actual temperature of the air in the first supply line 10a. The inner regulating circuit of the cascaded regulating circuits regulates the first trim valve 6a based on the temperature detected by the supply line temperature sensor 12a. The intermediate zone supply line temperature sensor 12c detects the actual temperature of the air in the intermediate zone supply line 10c. The regulating device 20 regulates the intermediate zone trim valve 8c based on the temperature detected by the intermediate zone supply line temperature sensor 12c. The first zone temperature sensor 16a is arranged such that the actually detected temperature is not substantially affected by the air exiting from the intermediate zone supply line 10c. Thus the intermediate zone 6c is not regulated by the actual temperature detected by the first zone temperature sensor 16a, but merely controlled thereby.

The set temperature of the air flowing into the intermediate zone 6c may, in a further embodiment of the invention, be determined from an average value of the set temperatures of the air flowing into the first zone 6a and the second zone 6b. The set temperatures of the air flowing into the first zone 6a and the second zone 6b may be differently weighted. For example, the set temperature of the air flowing into the first zone 6a could be weighted by 60% and the set temperature of the air flowing into the second zone 6b could be weighted by 40%. Said weighted average value determines, therefore, the set temperature of the air flowing into the intermediate zone 6c.

The set temperature of the air in the intermediate zone supply line 10c may differ from the set temperature of the air in the first supply line 10a by an offset. The offset between the set temperature of the air flowing into the second zone 6b and the set temperature of the air flowing into the intermediate zone 6c may, for example, be 2° C.

The determining of the offset and weighting may, for example, take place as a result of experimental values, for example, via the air flow in the cabin. As a result of the offset between the set temperature of the air flowing into the first zone 6a or into the second zone 6b, the averaging and/or the weighted averaging of the set temperatures of the air flowing into the first zone 6a and the second zone 6b may, for example, avoid a possibly disturbing air flow between the zones The association of the intermediate zone 6c with the first zone 6a or the second zone 6b may take place using software programming or by pin programming, i.e. by repositioning a plug connector on a control device of the aircraft air-conditioning system. As a result, an aircraft air-conditioning system may be very rapidly adapted to a plurality of zones of different lengths, without it being necessary to undertake mechanical modifications, such as for example adapting air deflection plates. Moreover, it is not required that the aircraft air-conditioning system according to the invention has to be calibrated again after allocating the intermediate zone 6c to the first zone 6a or to the second zone 6b. The adaptation of the aircraft air-conditioning system according to the invention to the altered cabin configuration may thus take place more rapidly and with less susceptibility to error than in aircraft air-conditioning systems of the prior art.

FIGS. 3a to 3d show a further embodiment of the aircraft air-conditioning system according to the invention for an aircraft comprising a first zone 6a, a second zone 6b, a first intermediate zone 6c and a second intermediate zone 6d. The first intermediate zone 6c comprises a first intermediate zone supply line 10c, a first intermediate zone distribution line 14c, a first intermediate zone supply line temperature sensor 12c and a first intermediate zone trim valve 8c. The second intermediate zone 6d, which is arranged between the first intermediate zone 6c and the second zone 6b, comprises a second intermediate zone supply line 10d, a second intermediate zone distribution line 14d, a second intermediate zone supply line temperature sensor 12d and a second intermediate zone trim valve 8d. The mode of operation of the components of the first zone 6a, the second zone 6b, the first intermediate zone 6c and the second intermediate zone 6d of the embodiment according to FIGS. 3a to 3d corresponds to the mode of operation of the embodiment according to FIGS. 2a to 2c. In the configuration according to 3b, the first intermediate zone 6c and the second intermediate zone 6d are associated with the second zone 6b. This configuration corresponds substantially to the configuration 2b, apart from that, in the configuration according to FIG. 3b, two intermediate zones are associated with the second zone 6b. The zone temperature sensor 16b detects the actual temperature of the air in the second zone 6b. Based thereon, the regulating device 20 determines the set temperature of the air in the first intermediate zone supply line 10c and the set temperature of the air in the second intermediate zone supply line 10d. The second zone temperature sensor 16b is, however, arranged such that the actually detected temperature is not influenced by the air which is discharged by the first intermediate zone supply line 10c or the second intermediate zone supply line 10d. Thus the set temperature of the air discharged by the first intermediate zone supply line 10c and the second intermediate zone supply line 10d is merely controlled via the second zone temperature sensor 16b The first intermediate zone 6c comprises a first intermediate zone supply line temperature sensor 12c, via which the regulating device 20 regulates the first intermediate zone trim valve 8c. The second intermediate zone 6d comprises a second intermediate zone supply line temperature sensor 12d which is used for regulating the second intermediate zone trim valve 8d.

In this embodiment, a second intermediate zone temperature sensor 16d may also be arranged in the second intermediate zone 6d which detects the actual temperature of the air in the second intermediate zone. For determining the set temperature of the air flowing into the first intermediate zone 6c and/or second intermediate zone 6d, however, not only the actual temperature detected by the second intermediate zone temperature sensor is used, since due to the short length of the first intermediate zone 6c and/or the short length of the second intermediate zone 6d, a stable regulating circuit can not be achieved. Thus, for determining the set temperature of the air flowing into the first intermediate zone 6c and/or into the second intermediate zone 6d, a combination of the actual temperatures is used which are detected by the second zone temperature sensor 16b and the second intermediate zone temperature sensor 16d. The temperature of the air in the second intermediate zone 6d detected by the second intermediate zone temperature sensor 16d may, moreover, be used in addition to the actual temperature detected by the second zone temperature sensor 16b for determining the set temperature of the air flowing into the second zone 6b. The second intermediate zone temperature sensor 16d has to be arranged such that air from the first zone 6a does not flow around said second intermediate zone temperature sensor. The second intermediate zone temperature sensor 16d only provides one additional actual value for determining the set temperature of the air flowing into the first intermediate zone 6c, the second intermediate zone 6d and/or the second zone 6b. The actual temperatures which are detected by the second intermediate zone temperature sensor 16d and the second zone temperature sensor 16b may be averaged or weighted and averaged.

Figure 3A:
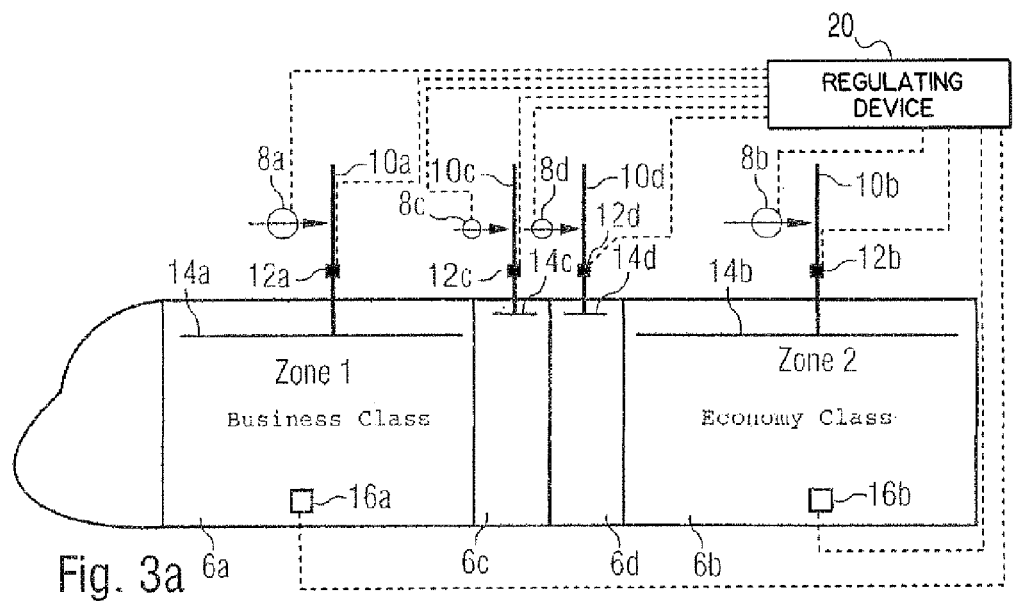
FIGS. 3a, 3b, 3c and 3d show an aircraft air-conditioning system for an aircraft cabin with a plurality of intermediate zones.
Figure 3B:
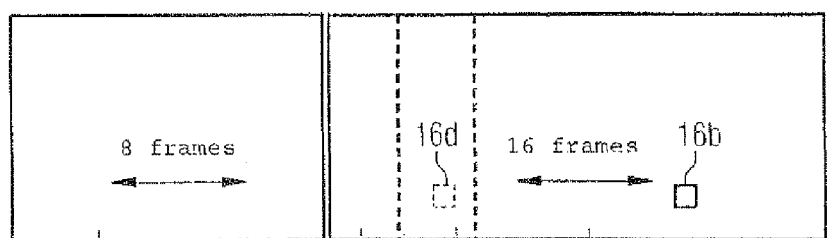
Figure 3C:
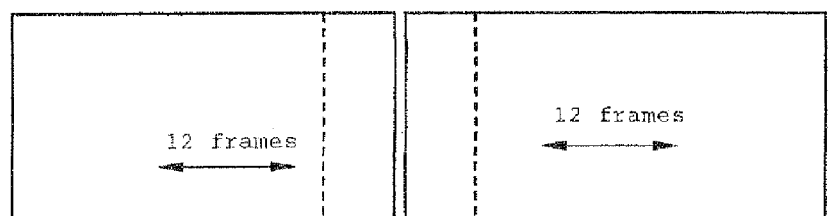

FIG. 3c shows a configuration in which the first intermediate zone 6c is associated with the first zone 6a and the second intermediate zone 6d is associated with the second zone 6b. The set temperature of the air flowing into the first intermediate zone 6c is determined by means of the actual temperature detected by the first zone temperature sensor 16a. The set temperature of the air flowing into the second intermediate zone 6d is determined via the actual temperature detected by the second zone temperature sensor 16b.

Figure 3D:
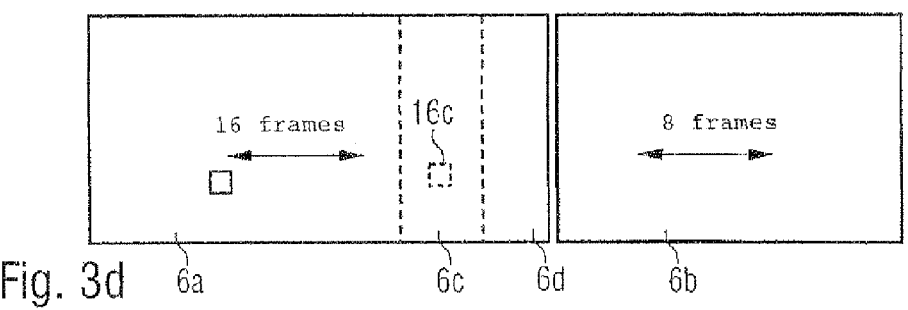

FIG. 3d shows a configuration in which the first intermediate zone 6c and the second intermediate zone 6d are associated with the first zone 6a. The mode of operation of the configuration according to FIG. 3d corresponds substantially to the configuration according to FIG. 3b with the exception that the set temperature of 10 the air flowing into the first intermediate zone 6c and the second intermediate zone 6d is based on the actual temperature determined by the first zone temperature sensor 16a. The configuration according to FIG. 3d may also comprise a first intermediate zone temperature sensor 16c. As has already been mentioned in the configuration according to FIG. 3b, the actual temperature detected by the first intermediate zone temperature sensor 16c merely determines in combination with the actual temperature detected by the first zone temperature sensor 16a the set temperature of the air flowing into the first intermediate zone 6a and/or into the second intermediate zone 6d.

Figure 4:
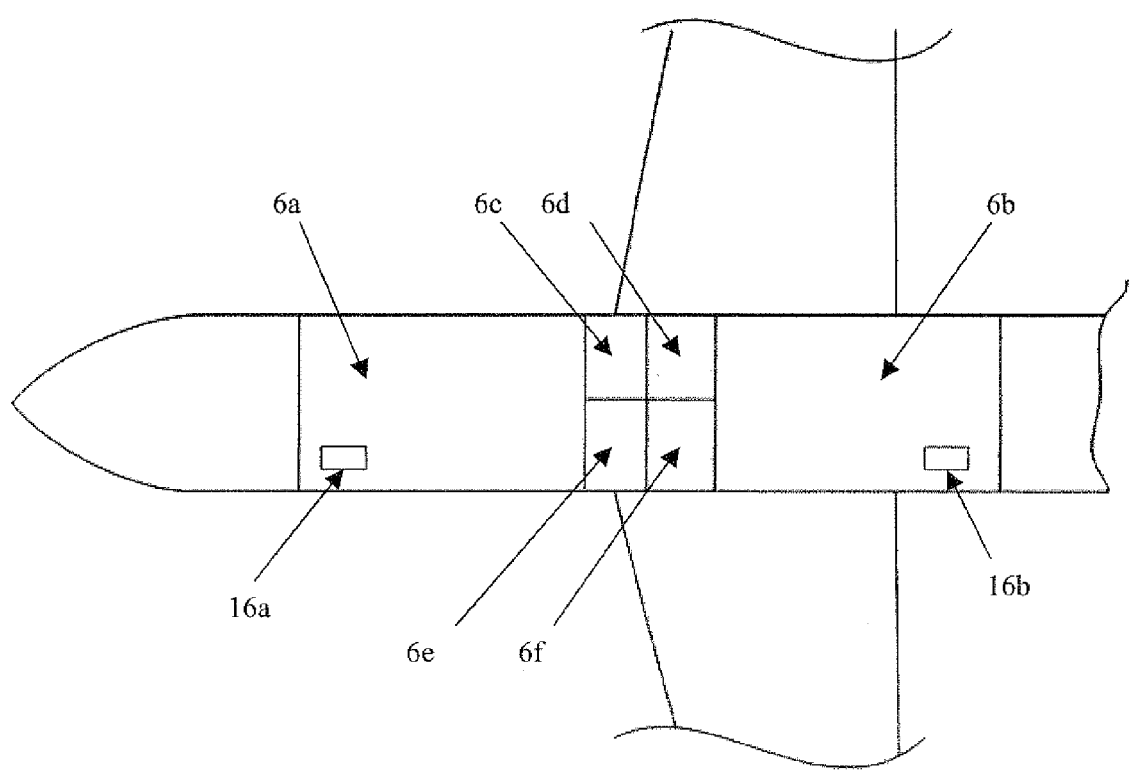
FIG. 4 shows an embodiment in which the intermediate zones are arranged perpendicular to the length axis of the cabin.

FIG. 4 shows an embodiment in which intermediate zones 6c and 6e as well as 6d and 6f are arranged perpendicular to the length axis of the cabin. Particularly, a third intermediate zone 6e is arranged adjacent to the first intermediate zone 6c in a direction perpendicular to the length direction of the cabin. A fourth intermediate zone 6f is arranged adjacent to the second intermediate zone 6d in a direction perpendicular to the length direction of the cabin. The second intermediate zone 6d is arranged adjacent to the first intermediate zone 6c in the length direction of the cabin. The third intermediate zone 6e is arranged adjacent to the fourth intermediate zone 6f in the length direction of the cabin. The intermediate zones 6c, 6d, 6e and 6f are arranged between the first zone 6a and the second zone 6b.

Figure 5:
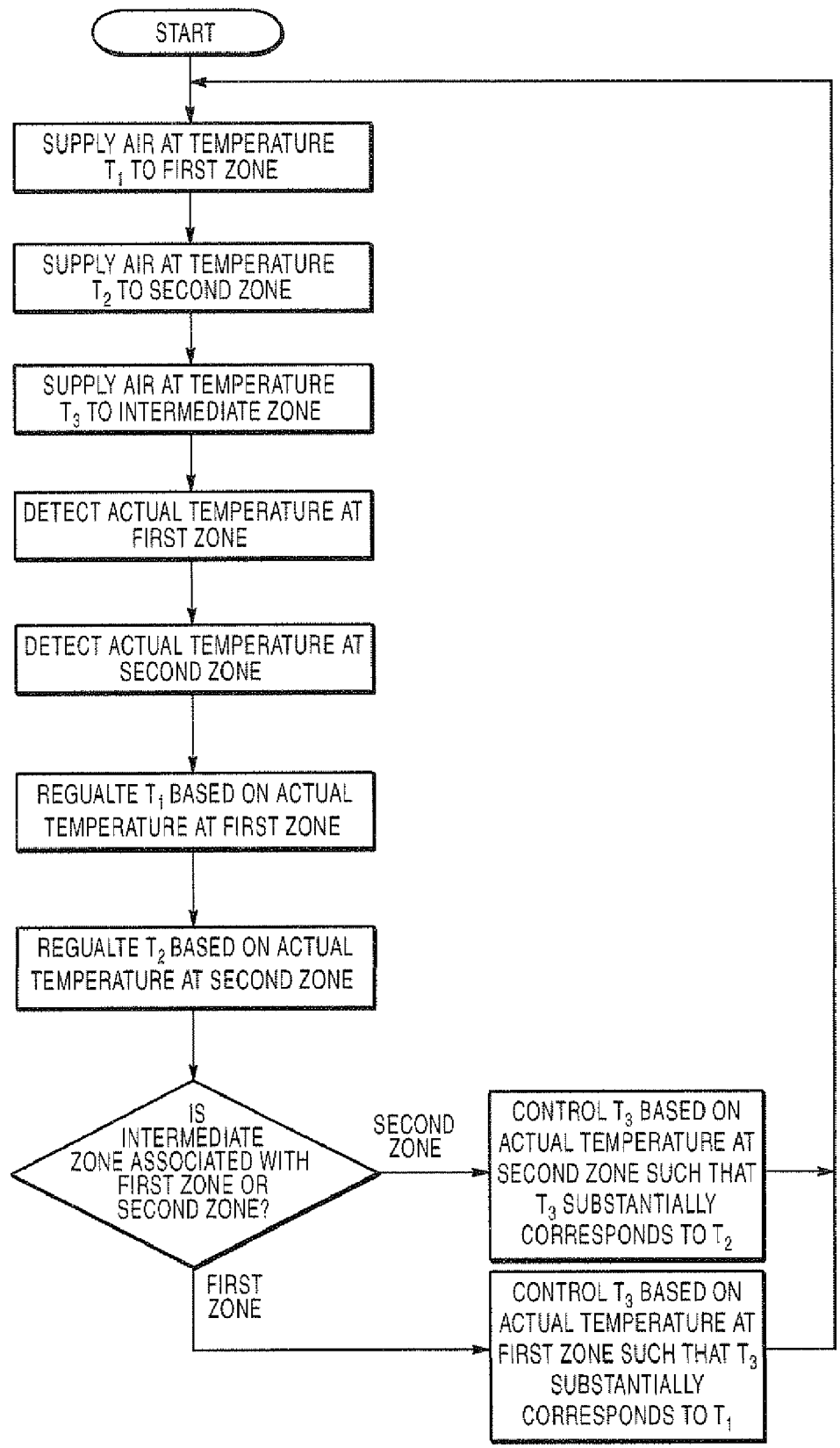
FIG. 5 is a flowchart showing a method for air conditioning an aircraft cabin in accordance with one embodiment of the current invention.

Thereby, very small intermediate zones can be created that cannot be controlled autonomously by a closed loop control due to stability reasons. Therefore the temperature of the air flowing into the intermediate zones 6c, 6d, 6e and 6f is controlled based on the actual value determined by the first zone temperature sensor 16a if an intermediate zone is assigned to the first zone 6a, or the second zone temperature sensor 16b if an intermediate zone is assigned to the second zone 6b. Particularly, if the first and second intermediate zones 6c and 6d are assigned to the first zone 6a and the third and fourth intermediate zones 6e and 6f are assigned to the second zone 6b, the temperature of the air flowing into the first and second intermediate zones 6c and 6d is controlled by the first zone temperature sensor 16a and the temperature of the air flowing into the third and fourth intermediate zones 6e and 6f is controlled by the second zone temperature sensor 16b. It is possible to assign only the first intermediate zone 6c to the first zone 6a and to assign the second, third and fourth intermediate zones 6d, 6e and 6f to the second zone 6b. Accordingly, the temperature of the air flowing into the first intermediate zones 6c is controlled by the first zone temperature sensor 16a and the temperature of the air flowing into the second, third and fourth intermediate zones 6d, 6e and 6f is controlled by the second zone temperature sensor 16b. FIG. 5 illustrates a method of air conditioning an aircraft cabin in accordance with the foregoing description.

The present invention has the advantage that the aircraft air-conditioning system may be rapidly and easily adapted to a current cabin configuration with a plurality of zones of variable length. The adaptation may take place using software programming or so-called pin programming, in which for example plug connections on the control device for the aircraft air-conditioning system are repositioned. In the vehicle air-conditioning system according to the invention, no mechanical modifications, for example displacing and adjusting deflection plates, are required in order to adapt said deflection plates to a new cabin configuration. Moreover, no further calibration is required after altering the cabin configuration. As a result, the adaptation of the aircraft air-conditioning system to an altered cabin configuration may be carried out, on the one hand, more rapidly and more easily and, on the other hand, the adaptation may be carried out in a manner which is less susceptible to error.

The invention claimed is:

1. Aircraft air-conditioning system which is configured for air-conditioning an aircraft cabin having a plurality of zones, comprising:

a first supply line, a first air-conditioning device, a first zone temperature sensor, and a first supply line temperature sensor, which are associated with a first zone of the aircraft cabin, the first supply line supplying air to the first zone, the first air-conditioning device configured for altering a temperature of air flowing into the first zone, the first zone temperature sensor detecting an actual temperature of air in the first zone, and the first supply line temperature sensor detecting an actual temperature of air flowing into the first zone, a second supply line, a second air-conditioning device, a second zone temperature sensor, and a second supply line temperature sensor, which are associated with a second zone of an aircraft cabin, the second supply line supplying air to the second zone, the second air-conditioning device being configured for altering a temperature of air flowing into the second zone, the second zone temperature sensor detecting an actual temperature of air in the second zone, and the second supply line temperature sensor detecting an actual temperature of air flowing into the second zone, an intermediate zone supply line, an intermediate zone air-conditioning device, an intermediate zone supply line temperature sensor, and an intermediate zone temperature sensor, which are associated with an intermediate zone located between the first zone and the second zone and selectively associated with either the first zone or the second zone to vary the length of the corresponding associated zone, the intermediate zone supply line supplying air to the intermediate zone, the intermediate zone air-conditioning device being configured for altering a temperature of air flowing into the first intermediate zone, the intermediate zone supply line temperature sensor detecting an actual temperature of air flowing into the intermediate zone, and the intermediate zone temperature sensor detecting an actual temperature of the air in the intermediate zone, and a regulating device, wherein if the intermediate zone is associated with and adjacent to the first zone, the regulating device regulates a set temperature of the air flowing into the intermediate zone based on the detected actual temperature of the air in the first zone in combination with the detected actual temperature of the air in the intermediate zone, and wherein if the intermediate zone is associated with and adjacent to the second zone, the regulating device regulates a set temperature of the air flowing into the intermediate zone based on the detected actual temperature of the air in the second zone as detected by a second zone temperature sensor in combination with the detected actual temperature of the air in the intermediate zone.

2. Aircraft air-conditioning system according to claim 1, wherein the aircraft air-conditioning system is configured for air-conditioning a plurality of intermediate zones which are located between the first zone and the second zone and are each selectively associated with the first zone or the second zone,
wherein each intermediate zone is associated with an intermediate zone supply line which supplies air to the corresponding intermediate zone, an intermediate zone air-conditioning device which alters a temperature of air flowing into the corresponding intermediate zone, an intermediate zone temperature sensor which detects an actual temperature of air in the corresponding intermediate zone, and an intermediate zone supply line temperature sensor which detects an actual temperature of the air flowing into the corresponding intermediate zone,
wherein if a selected intermediate zone is associated with the first zone and is not adjacent to the first zone, the regulating device regulates a set temperature of the air flowing into the selected intermediate zone based on at least the detected actual temperature of the air in the first zone, and
wherein if a selected intermediate zone is associated with the second zone and is not adjacent to the second zone, the regulating device regulates a set temperature of the air flowing into the selected intermediate zone based on at least the detected actual temperature of the air in the second zone.

3. Aircraft air-conditioning system according to claim 1, wherein the intermediate zone is shorter in length than a zone length required to ensure a stable closed loop temperature regulation of the intermediate zone by itself.

4. Aircraft air-conditioning system according to claim 1, wherein each of the first air-conditioning device, the second air-conditioning device, and the intermediate zone air-conditioning device includes at least one of a trim valve, a heating device, and a cooling device.

5. Aircraft air-conditioning system according to claim 2, wherein the regulating device regulates the set temperature of the air flowing into the intermediate zone that is not adjacent to the associated first or second zone such that:
if the intermediate zone is associated with the first zone, the set temperature of the air flowing into the intermediate zone substantially corresponds to the set temperature of the air flowing into the first zone plus an offset, and
if the intermediate zone is associated with the second zone, the set temperature of the air flowing into the intermediate zone substantially corresponds to the set temperature of the air flowing into the second zone plus an offset.

6. Aircraft air-conditioning system according to claim 2, wherein the aircraft air-conditioning system is configured such that the set temperature of the air flowing into the intermediate zone that is not adjacent to the associated first or second zone substantially corresponds to the average value of the set temperature of the air flowing into the first zone and the air flowing into the second zone.

7. Aircraft air-conditioning system according to claim 2, wherein the aircraft air-conditioning system is configured such that the set temperature of the air flowing into the intermediate zone that is not adjacent to the associated first or second zone substantially corresponds to a weighted average value of the set temperature of the air flowing into the first zone and of the air flowing into the second zone.

8. Aircraft air-conditioning system according to claim 1, wherein the intermediate zone temperature sensor is positioned in the aircraft cabin at the intermediate zone.

9. Aircraft air-conditioning system according to claim 1, wherein the regulating device is configured such that:
if the intermediate zone is associated with and not adjacent to the first zone, the regulating device regulates the set temperature of the air flowing into the intermediate zone, based on the actual temperature of the air in the first zone and the actual temperature of the air in the intermediate zone, and
if the intermediate zone is associated with and not adjacent to the second zone, the regulating device regulates the set temperature of the air flowing into the intermediate zone based on the actual temperature of the air in the second zone and the actual temperature of the air in the intermediate zone.

10. Aircraft air-conditioning system according to claim 1, wherein the plurality of zones includes a plurality of intermediate zones arranged perpendicular to a length axis of the cabin.

11. Method for air-conditioning an aircraft cabin which comprises a first zone and a second zone as well as at least one intermediate zone selectively associated with the first zone or the second zone, the method comprising:
detecting the actual temperature of the air in the first zone;
detecting the actual temperature of the air in the second zone;
detecting the actual temperature of the air in the at least one intermediate zone;
supplying air at a first set temperature to the first zone via a first supply line;
supplying air at a second set temperature to the second zone via a second supply line;
regulating the first set temperature based on the actual temperature of the first zone;
regulating the second set temperature based on the actual temperature of the second zone;
supplying air at a third set temperature to the at least one intermediate zone via an intermediate zone supply line;
controlling the third set temperature based on the actual temperature of the first zone and the actual temperature of the at least one intermediate zone, if the at least one intermediate zone is associated with and adjacent to the first zone, and
controlling the third set temperature based on the actual temperature of the second zone and the actual temperature of the at least one intermediate zone, if the at least one intermediate zone is associated with and adjacent to the second zone.

12. Method for air-conditioning an aircraft cabin according to claim 11, further comprising:
detecting the actual temperatures of a plurality of intermediate zones; and
if a selected intermediate zone of the plurality of intermediate zones is associated with and not adjacent to one of the first and second zones, regulating a set temperature of air supplied to the selected intermediate zone based on at least the actual temperature of the associated first or second zone.

13. Method for air-conditioning an aircraft cabin according to claim 11, wherein the first zone corresponds to business class seating, the second zone corresponds to economy class seating, and the intermediate zone is assignable to one of the first zone and the second zone to provide extended business class seating and extended economy class seating, respectively.

14. Aircraft air-conditioning system according to claim 1, wherein the first zone corresponds to business class seating, the second zone corresponds to economy class seating, and the intermediate zone is assignable to one of the first zone and the second zone to provide extended business class seating and extended economy class seating, respectively.

* * * * *